United States Patent
An et al.

(10) Patent No.: US 7,319,458 B2
(45) Date of Patent: Jan. 15, 2008

(54) ELECTRONIC DEVICE WITH FUNCTIONS COMPARABLE TO JOYSTICK AND TABLET

(75) Inventors: Chen Chih An, Taipei (TW); Chen Pin, Hsinchu (TW); Wang Chiu Ting, Tainan (TW)

(73) Assignee: WALTOP International Corp., Hsin-Chu (TW)

( * ) Notice: Subject to any disclaimer, the term of this patent is extended or adjusted under 35 U.S.C. 154(b) by 547 days.

(21) Appl. No.: 11/023,562

(22) Filed: Dec. 29, 2004

(65) Prior Publication Data

US 2006/0109253 A1    May 25, 2006

(30) Foreign Application Priority Data

Nov. 19, 2004   (TW) ............................... 93218549 U

(51) Int. Cl.
*G06F 3/41*        (2006.01)
*G06F 3/33*        (2006.01)

(52) U.S. Cl. ...................... 345/173; 345/156; 345/161; 345/179; 178/18.01

(58) Field of Classification Search ........ 345/156–184; 178/18.01–18.11, 19.01–19.07, 20.01–20.04
See application file for complete search history.

(56) References Cited

U.S. PATENT DOCUMENTS 4,780,707 A * 10/1988  Selker ..................... 178/19.01
5,214,428 A *  5/1993  Allen ......................... 345/179
5,402,151 A *  3/1995  Duwaer ..................... 345/173

\* cited by examiner

*Primary Examiner*—David L. Lewis
(74) *Attorney, Agent, or Firm*—Troxell Law Office, PLLC

(57) ABSTRACT

A multifunction electronic device with function comparable to joystick and tablet, comprising: an electromagnetic signal emitting unit, having an electromagnetic signal emitter arranged at the bottom thereof; a supporting frame, for fixing and supporting the electromagnetic signal emitting unit at a position over an electromagnetic signal receiving unit while allowing the same to be tilted and spun freely; the electromagnetic signal receiving unit, having a sensing circuit disposed therein for receiving the signals emitted from the electromagnetic signal emitter, capable of executing an operation with respect to the received signals for obtaining a coordinate of movement corresponding to the electromagnetic signal emitting unit while converting the coordinate of movement into electronic signal and transmitting the converted electronic signal to a computer; wherein, the cooperative operating of the electromagnetic signal emitting unit and the electromagnetic signal receiving unit is functioned as a digitizing tablet while the supporting frame is removed from the position over the electromagnetic signal receiving unit and the electromagnetic signal emitting unit is freed from the supporting frame.

10 Claims, 5 Drawing Sheets

ELECTRONIC DEVICE WITH FUNCTIONS COMPARABLE TO JOYSTICK AND TABLET

FIELD OF THE INVENTION

The present invention relates to an electronic device with functions comparable to joystick and tablet, and more particularly, to a multifunction computer peripheral device configured by installing a light pen in a supporting frame arranged on a tablet, which is capable of functioning as a joystick for PC games or as a digitizing tablet with light pen while the light pen is freed from the supporting frame and the supporting frame is detached from the tablet.

BACKGROUND OF THE INVENTION

More than just business tools and toys, computers can become vital agents of socially beneficial change. Nearly every person has to conduct some of his day-today activities using a computer, and almost without exception that the vast majority of computer users hold a high opinion of the computerized world as a place to conduct everyday tasks and pursue the everyday pleasures of life, such as writing homework/report, surfing the Internet, communicating with friends and families or conducting business affairs by e-mail, playing video games, and so on. Among all, the emerging of on-line games further boost the popularity of computer, since the on-line game not only presents a virtue world full of imagination and fun, but also provides a new way of communication through the chatting room provided by on-line games.

It is common for a computer game to employ certain computer peripherals, such as keyboard, mouse, joystick and gamepad, etc., as controlling device of the game. Nevertheless, joysticks are preferred by most computer games. However, whilst a variety of different types of joystick have previous been proposed, most of the improvements on joystick are focused on appearance that enables the joystick to have a hi-tech, glamorous, and stream-lined outlook, and only a few try to improve the mechanical structure of the conventional joystick for enhancing the precision of positioning and smoothness of converting movements of the joystick into electrical signals.

In this regard, it is preferred to have a multifunction peripheral which can be used as a joystick featuring the advantages of electromagnetic tablet, or can be used as a tablet by a certain structural variation.

SUMMARY OF THE INVENTION

It is the primary object of the invention to provide a multifunction electronic device configured by installing a light pen in a supporting frame arranged on a tablet, which is capable of functioning as a joystick for PC games and as a digitizing tablet with light pen for inputting characters, graphics and coordinates while the light pen is freed from the supporting frame and the supporting frame is detached from the tablet.

It is another object of the invention to provide a multifunction electronic device with functions comparable to joystick and tablet, capable of selectively functioning as a joystick or a digitizing tablet with respect to a mode selection controlled by a mechanic switch or a programmable tablet button.

To achieve the above objects, the present invention provides a multifunction electronic device with functions comparable to joystick and tablet, comprising:

an electromagnetic signal emitting unit, having an electromagnetic signal emitter arranged at the bottom thereof;

a supporting frame, for fixing and supporting the electromagnetic signal emitting unit over an electromagnetic signal receiving unit while allowing the same to be tilted and spun freely;

the electromagnetic signal receiving unit, having a sensing circuit disposed therein for receiving the signals emitted from the electromagnetic signal emitter, capable of executing an operation with respect to the received signals for obtaining a coordinate of movement corresponding to the electromagnetic signal emitting unit while converting the coordinate of movement into electronic signal and transmitting the converted electronic signal to a computer;

wherein, the cooperative operating of the electromagnetic signal emitting unit and the electromagnetic signal receiving unit is functioned as a digitizing tablet while the supporting frame is removed from the device and the electromagnetic signal emitting unit is freed from the supporting frame.

The structure and principle of the present invention will be described in detail through the preferred embodiments as follows with reference to the accompanying drawings.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
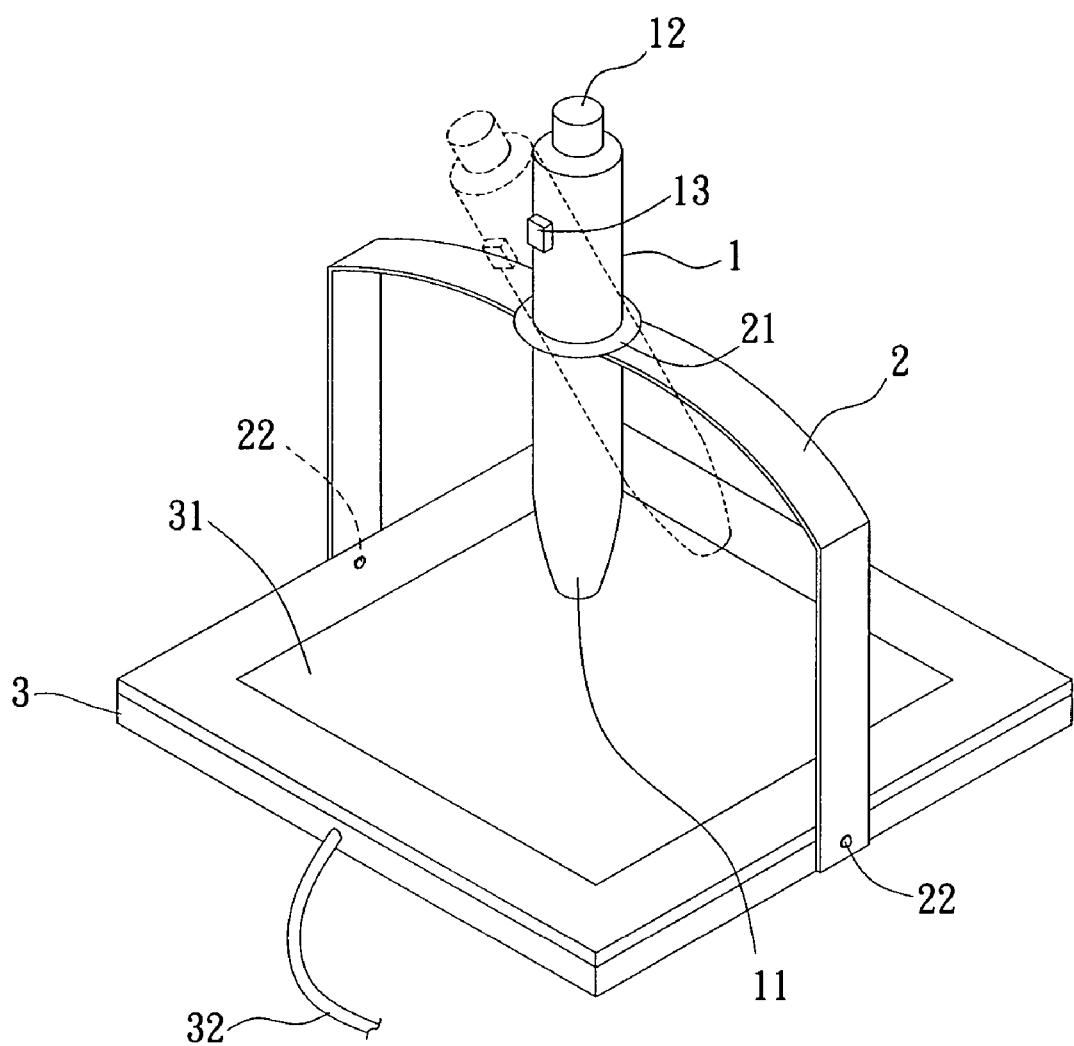
FIG. 1 is a three dimensional view of a multifunction electronic device according to the first embodiment of the present invention.

Please refer to FIG. 1, which is a three dimensional view of a multifunction electronic device according to the first embodiment of the present invention. The multifunction electronic device with functions comparable to joystick and tablet of FIG. 1 comprises:

an electromagnetic signal emitting unit 1, having an electromagnetic signal emitter 11 arranged at the bottom thereof, and a first button 12 and a second button 13 disposed at the top thereof; wherein, as the electromagnetic signal emitting unit 1 is tilted and pivoted about a fixed point in at least two dimensional (X and Y) space, the positioning of the electromagnetic signal emitter is changed accordingly and the displacement of the same can be calculated, and the two buttons 12 and 13 can work cooperatively or independently for controlling the relating Z coordinate;

a supporting frame 2, being fixed onto an electromagnetic signal receiving unit 3 by pivotal axes 22 arranged at the two sides of the same in respective, further comprising a bushing 21 for fixing and supporting the electromagnetic signal emitting unit 1 at a position over the electromagnetic signal receiving unit 3 while allowing the same to be tilted and spun freely; wherein the means used for coupling the bushing 211 and the electromagnetic signal emitting unit 1 can be selected from the group consisting of screwing, riveting, and clipping, etc., and the bushing 211 is made of a flexible material for enabling the same to hold the electromagnetic signal emitting unit therein in a fixed status enabling the electromagnetic signal emitting unit 1 to spin freely.

the electromagnetic signal receiving unit 3, having a sensing circuit 31 disposed therein for receiving the signals emitted from the electromagnetic signal emitter 11, capable of executing an operation with respect to the received signals for obtaining a coordinate of movement corresponding to the electromagnetic signal emitting 11 unit while converting the coordinate of movement into electronic signal and transmitting the converted electronic signal to a computer through an interface 32 selected from the group consisting of Gameport interface, USB interface, PS2 interface and RS232 interface, and so on;

wherein, the cooperative operating of the electromagnetic signal emitting unit 1 and the electromagnetic signal receiving unit 3 is functioned as a digitizing tablet while the supporting frame 2 is removed from the position over the electromagnetic signal receiving unit 3 and the electromagnetic signal emitting unit 1 is freed from the supporting frame 3, in addition, the electromagnetic signal emitting unit 1 can be a wireless inputting pen.

Figure 2:
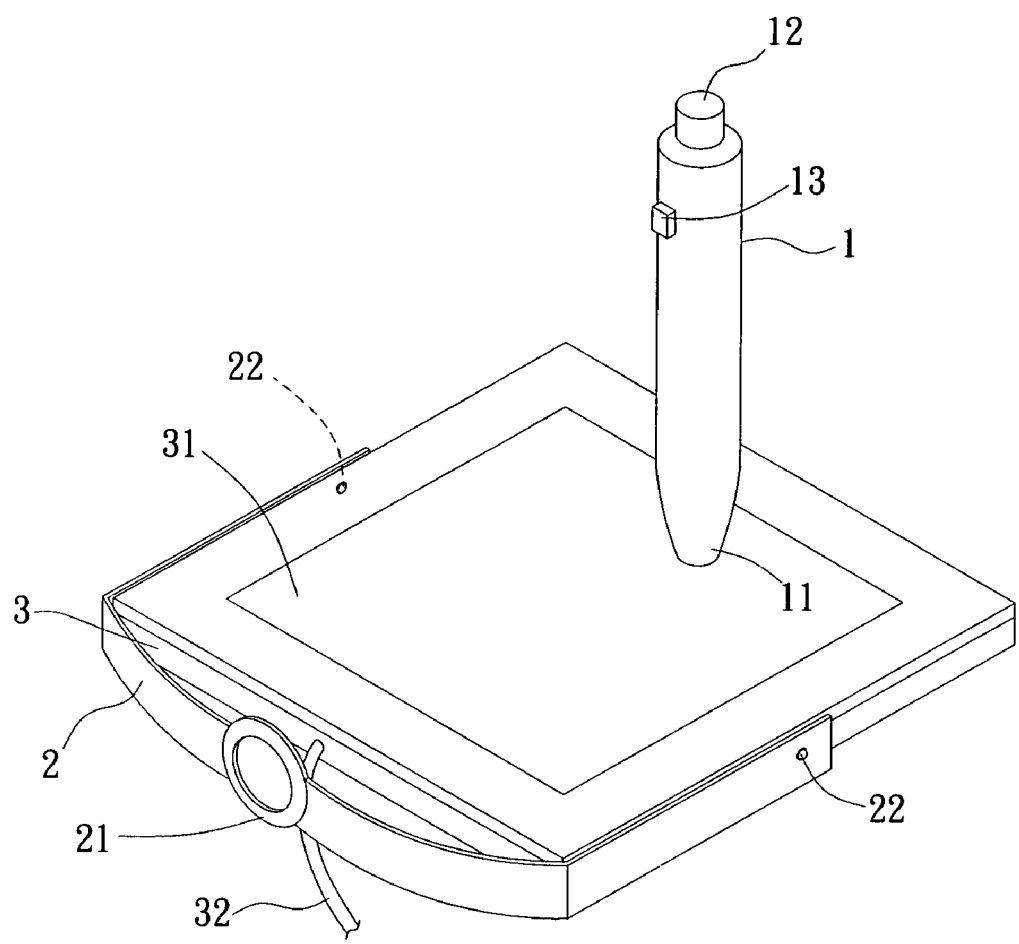
FIG. 2 is a schematic representation showing a digitizing tablet formed by pivotally leveling off the supporting frame of the multifunction electronic device of the invention.

Please refer to FIG. 2, which is a schematic representation showing a digitizing tablet formed by pivotally leveling off the supporting frame of the multifunction electronic device of the invention. As seen in FIG. 2, the supporting frame 2 is positioned over the electromagnetic signal receiving unit 3 for enabling the electromagnetic signal emitting unit 1 to be hold in a vertical status and the multifunction electronic device to act as a joystick, however, the supporting frame 3 is redundant while intending to enabling the multifunction electronic device to act as a tablet such that the supporting frames is pivotally leveled off to a horizontal status. Moreover, the multifunction electronic device of the present invention is capable of selectively functioning as a joystick or a digitizing tablet with respect to a mode selection controlled by a mechanic switch or a programmable tablet button, however, the foregoing mode selection is commonly practiced by those skilled in the prior and thud void from further description hereinafter.

Figure 3:
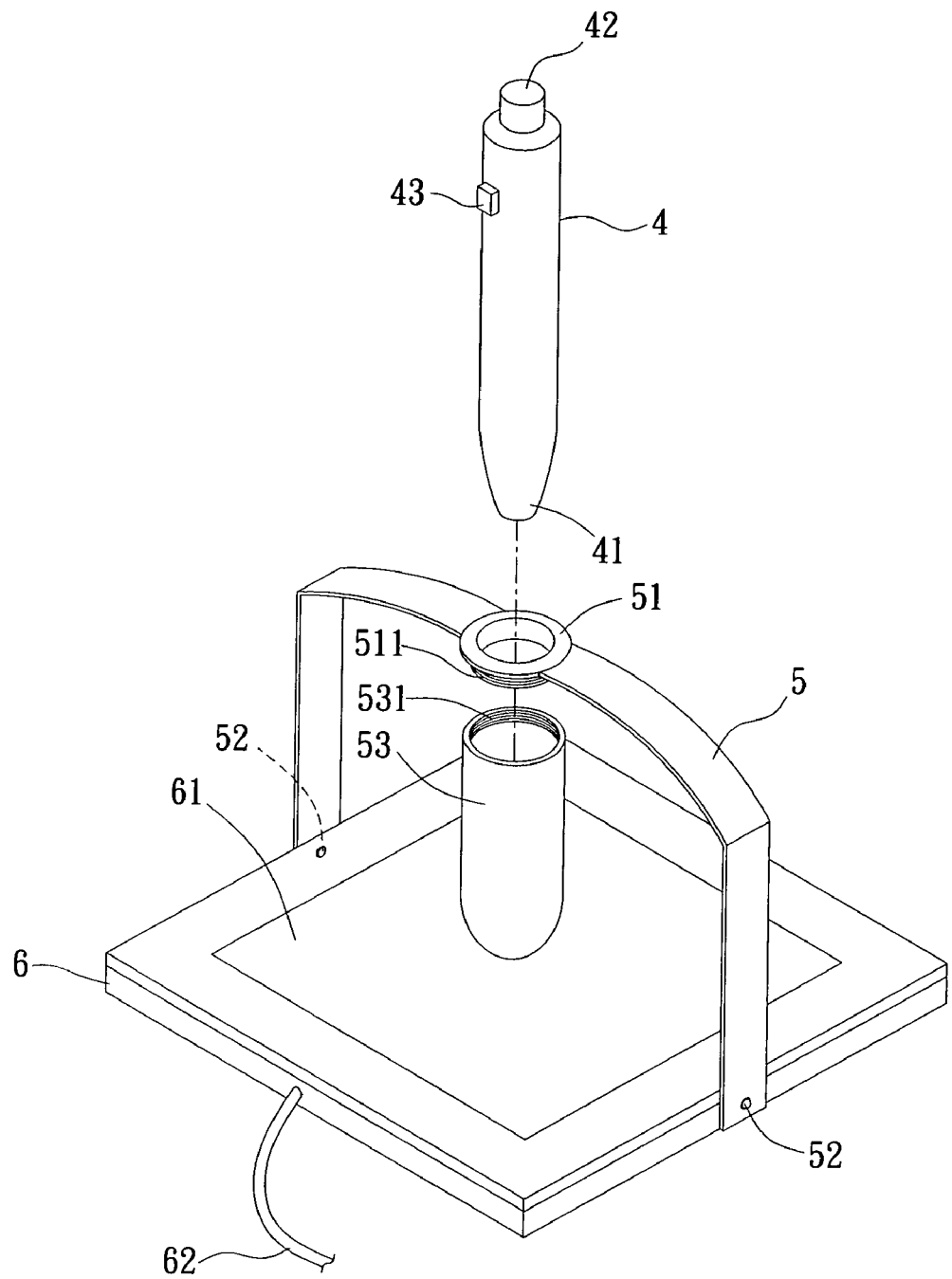
FIG. 3 is a three dimensional view of a multifunction electronic device according to the second embodiment of the present invention.

Please refer to FIG. 3, which is a three dimensional view of a multifunction electronic device according to the second embodiment of the present invention. The multifunction electronic device of FIG. 3 comprises an electromagnetic signal emitting unit 4, a supporting frame 5 and an electromagnetic signal receiving unit 6, which are mostly the same as the device shown in FIG. 1. However, the supporting frame 5 further comprises a bushing 51 and a sheath 53, which is different to the supporting frame 2 comprises only a bushing 21. As seen in FIG. 3, the busing 51 is made of flexible material and the sheath 52 is capable of being screw-fixed to the bushing, i.e. by screwing the thread 511 of the bushing 51 to the internal thread 531 of the sheath 53, such that the sheath 52 can receive the electromagnetic signal emitting unit 4 therein while holding the same in a fixed status for enabling the same to spin freely. Similar to that shown in FIG. 2 that the multifunction electronic device is also capable of functioning as a digitizing tablet, nevertheless, the only additional to that of FIG. 2 is the detaching of sheath 53 from the bushing 51.

Figure 4:
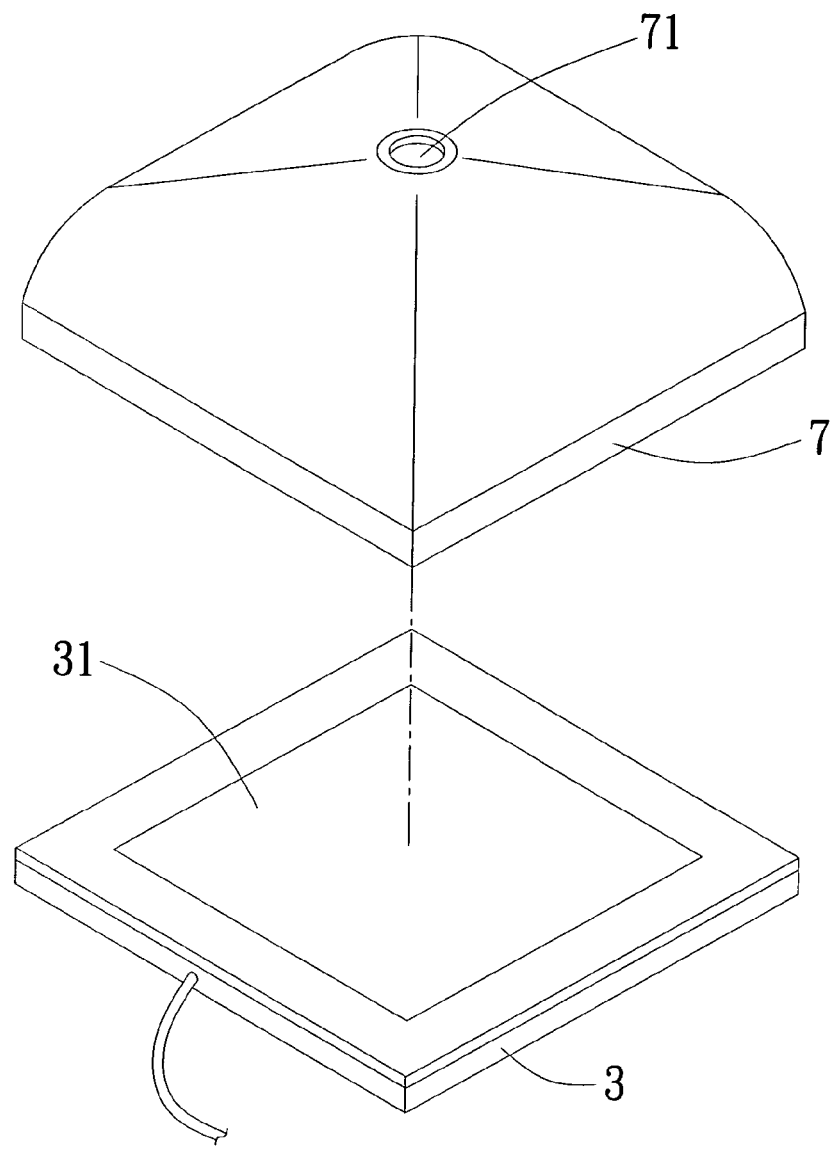
FIG. 4 is a three dimensional view of a multifunction electronic device according to the third embodiment of the present invention.

Please refer to FIG. 4, which is a three dimensional view of a multifunction electronic device according to the third embodiment of the present invention. The supporting frame 7 shown in FIG. 4 is a hollow arc-shaped body which covers the electromagnetic signal receiving unit 3 completely and is fixed onto the electromagnetic signal receiving unit 3 by clipping the circumferences of the same to the edges of the electromagnetic signal receiving unit 3. However, the means for fixing the supporting frame 7 onto the electromagnetic signal receiving unit 3 is not limited by clipping, but including any means capable of detaching the two easily and rapidly. In addition, the multifunction electronic device can provide a better dust-proof effect than that of the devices shown in FIG. 1 and FIG. 3, since the supporting frame 3 covers the electromagnetic signal receiving unit 3 completely. Moreover, the bushing 71 of the supporting frame 7 is structured and functioned the same as those shown in FIG. 1 and FIG. 3.

Figure 5:
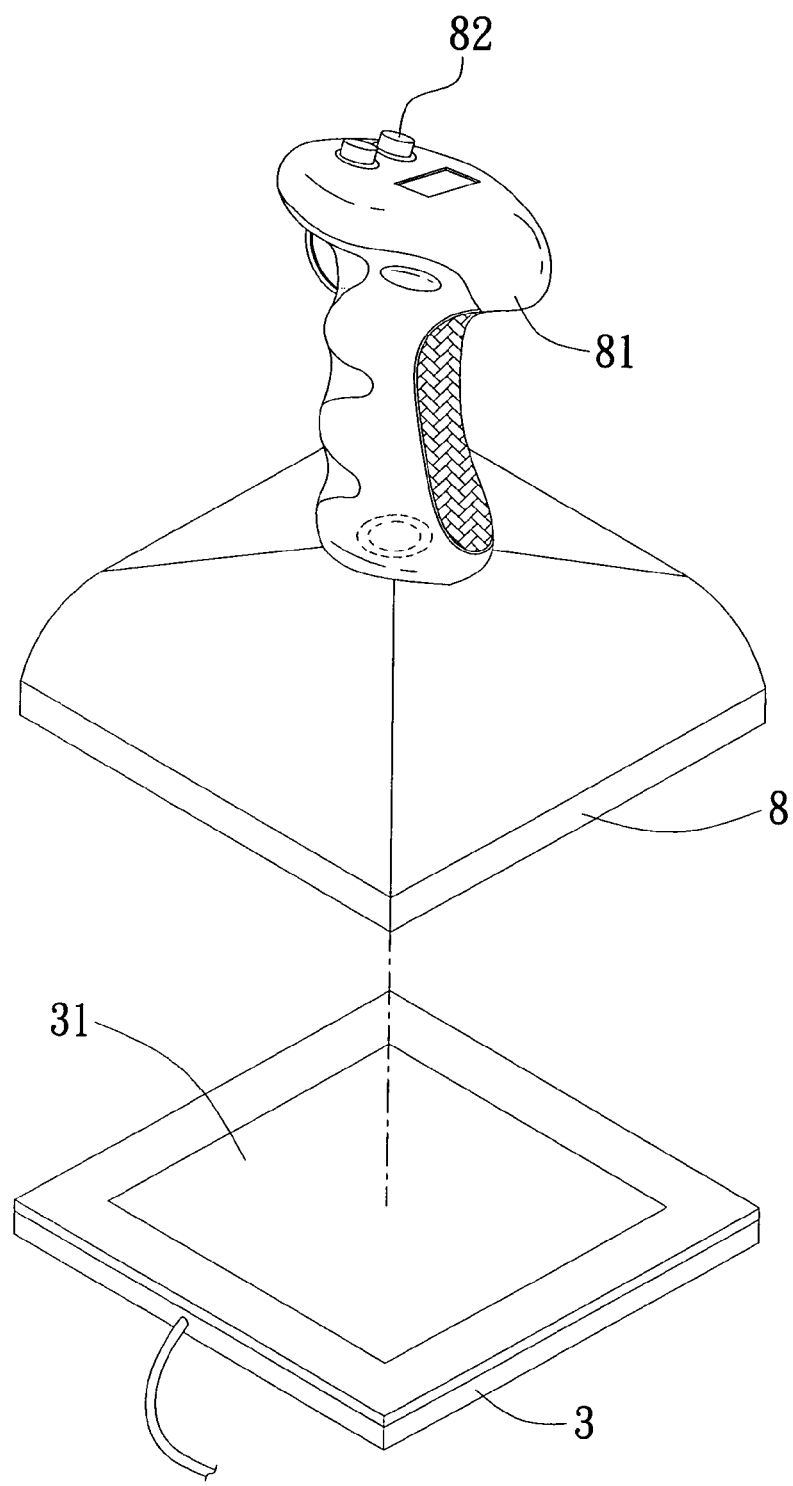
FIG. 5 is a three dimensional view of a multifunction electronic device according to the fourth embodiment of the present invention.

Please refer to FIG. 5, which is a three dimensional view of a multifunction electronic device according to the fourth embodiment of the present invention. In the multifunction electronic device shown in FIG. 4, the electromagnetic signal emitting unit is replaced by a shaft 81 with ergonimic design, which is installing in the supporting frame 8 and has two buttons 82 arranged thereon for the applications of PC game. However, there can be more than two buttons arranged in the shaft 81 basing the requirement of PC games.

From the above description, the present invention provides a multifunction electronic device with function comparable to joystick and tablet, which is functioned as a joystick while the electromagnetic signal emitting unit is installed in the supporting frame, and is functioned as a tablet while the supporting frame is removed from the position over the electromagnetic signal receiving unit and the electromagnetic signal emitting unit is freed from the supporting frame. By virtue of this, the multifunction electronic device is equipped with functions of a joystick and a tablet, that enables a user to pay a price of one but get a product of two in reality. In summary that this invention has been disclosed and illustrated with reference to particular embodiments, the principles involved are susceptible for use in numerous other embodiments that will be apparent to persons skilled in the art. Consequently, the present invention has been examined to be progressive and has great potential in commercial applications.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multifunction electronic device with function comparable to joystick and tablet, comprising:
   an electromagnetic signal emitting unit, having an electromagnetic signal emitter arranged at the bottom thereof;

a supporting frame, for fixing and supporting the electromagnetic signal emitting unit at a position over an electromagnetic signal receiving unit while allowing the same to be tilted and spun freely;

the electromagnetic signal receiving unit, having a sensing circuit disposed therein for receiving the signals emitted from the electromagnetic signal emitter, capable of executing an operation with respect to the received signals for obtaining a coordinate of movement corresponding to the electromagnetic signal emitting unit while converting the coordinate of movement into electronic signal and transmitting the converted electronic signal to a computer;

wherein, the cooperative operating of the electromagnetic signal emitting unit and the electromagnetic signal receiving unit is functioned as a digitizing tablet while the supporting frame is removed from the position over the electromagnetic signal receiving unit and the electromagnetic signal emitting unit is freed from the supporting frame.

2. The multifunction electronic device of claim 1, wherein the electromagnetic signal emitting unit is a wireless inputting pen, capable of operating cooperatively with the electromagnetic signal receiving unit as a digitizing tablet while being freed from the supporting frame.

3. The multifunction electronic device of claim 1, wherein the electromagnetic signal emitting unit has a plurality of buttons arranged thereon, each capable of directing the electromagnetic signal emitter to emit an electromagnetic signal to be received by the electromagnetic signal receiving unit.

4. The multifunction electronic device of claim 1, wherein the supporting frame further comprises a bushing made of a flexible material, capable of holding the electromagnetic signal emitting unit therein in a fixed status enabling the same to spin freely.

5. The multifunction electronic device of claim 1, wherein the supporting frame further comprises:

a busing, made of flexible material; and a sheath, capable of being screw-fixed to the bushing, for receiving the electromagnetic signal emitting unit therein and holding the same in a fixed status enabling the same to spin freely.

6. The multifunction electronic device of claim 1, wherein the interface used for connecting the electromagnetic signal receiving unit and the computer is a Gameport interface.

7. The multifunction electronic device of claim 1, wherein the interface used for connecting the electromagnetic signal receiving unit and the computer is an USB interface.

8. The multifunction electronic device of claim 1, wherein the interface used for connecting the electromagnetic signal receiving unit and the computer is a PS2 interface.

9. The multifunction electronic device of claim 1, wherein the interface used for connecting the electromagnetic signal receiving unit and the computer is a RS232 interface.

10. The multifunction electronic device of claim 1, wherein capable of selectively functioning as a joystick or a digitizing tablet with respect to a mode selection controlled by a mechanic switch or a programmable tablet button.

* * * * *